Patented June 20, 1944

2,351,844

UNITED STATES PATENT OFFICE 2,351,844

CHLOROCAFFEINE NITRATE AND NITRITE AND PROCESS OF MAKING THEM

John H. Speer, Skokie, Ill., assignor to G. D. Searle & Co., Chicago, Ill., a corporation of Illinois No Drawing. Application March 6, 1942, Serial No. 433,639

6 Claims. (Cl. 260—256)

This invention relates to two new compounds which I have prepared for the first time and which I have found to be very useful in therapeutics, and to a process for preparing these compounds. These compounds are represented by the formula:

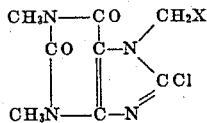

wherein X represents a nitrate ($NO_3$) or a nitrite ($NO_2$) group. They are known in precise chemical terminology as $7^1$-hydroxy-8-chlorocaffeine nitrate ester and $7^1$-hydroxy-8-chlorocaffeine nitrite ester, respectively, though for convenience they will be referred to as chlorocaffeine nitrate and nitrite, respectively.

Nitrate and nitrite esters of simple aliphatic and aromatic substituted aliphatic alcohols have been prepared by others in a number of instances. Nitrate salts of a number of alkaloids are also commonly known but, so far as I am aware, no one has prepared or described a nitrate ester of an alkaloid, particularly of a methylated xanthine, prior to my present invention and to that described in my copending application, Serial No. 433,638, filed March 6, 1942. The esters of the invention herein described are completely different from nitrate or nitrite salts of alkaloids in that they are un-ionized, or very sparingly soluble in water, and can be separated into the constituent acid and alkaloid residue only by a chemical hydrolysis. The esters of this invention are also quite different from nitro-compounds, even though the formula of the nitrite ester is isomeric with that of a nitro compound. This difference can be readily demonstrated by the fact that nitro compounds characteristically cannot be hydrolyzed to nitric (or nitrous) acid and an organic residue, whereas the esters of the present invention are readily hydrolyzed by mild agents to the corresponding acid and an alkaloidal residue.

The esters of the present invention, unlike many of the simple nitrate or nitrite esters, cannot be made by treatment of the parent alcohol with the proper acid, inasmuch as the parent alcohol ($7^1$-hydroxy-8-chlorocaffeine) is too unstable. They are most conveniently prepared from 7:8-dichlorocaffeine by interaction with a silver salt in an appropriate solvent, as described in the following examples.

Example 1.—One hundred sixty grams of 7:8-dichlorocaffeine, 112 grams of silver nitrate and three liters of absolute alcohol are boiled gently together under a reflux condenser for one hour, during which time vigorous stirring is maintained. The resultant suspension is filtered while hot. The clear liquor deposits crystals of chlorocaffeine nitrate upon cooling. This may be purified by recrystallization from absolute alcohol and, when quite pure, melts at 159–160° centigrade. Its constitution may be verified by elementary analysis.

Example 2.—One hundred sixty grams of 7:8-dichlorocaffeine, 102 grams of silver nitrite (freshly precipitated and dried in vacuum) and 1300 cubic centimetres of absolute alcohol are boiled together under a reflux condenser for one hour, during which time vigorous stirring is maintained and a slow stream of nitrogen gas is passed through the solution. The resultant suspension is filtered while hot and, upon cooling, the clear liquor deposits crystals of $7^1$-hydroxy-8-chlorocaffeine nitrite ester. This may be purified by recrystallization from absolute alcohol and, when substantially pure, melts at 115–116° C. The composition of this compound may be verified by elementary analysis.

The esters disclosed and claimed herein are white, stable, non-hydroscopic, crystalline compounds, which are very sparingly soluble in water or dilute aqueous acid or alkaline solutions. They are readily hydrolized by hot dilute acid solution yielding, as a final product, 8-chlorotheophylline. These esters are particularly useful in therapeutics, causing a moderate but prolonged fall in blood pressure in both test animals and human beings. In dogs, doses as low as 0.2 gram per kilogram of weight have caused a fall in blood pressure of as much as 15 to 20 percent persisting over several hours. In man, a dose of one grain repeated two to four times daily has been found to maintain a blood pressure level materially below the control level. The difference in therapeutic activity between the nitrate and nitrite esters appears to be small. The compounds are relatively non-toxic, having caused no untoward toxic symptoms in any of the human subjects in the dosages above mentioned. The acute toxicity as determined in rats is less than that of caffeine.

It will be understood that the invention is not limited except as defined by the appended claims.

I claim:

1. A new composition of matter consisting of a member of the group including the nitrate and nitrite esters of $7^1$-hydroxy-8-chlorocaffeine.

2. A new composition of matter consisting of the nitrate ester of $7^1$-hydroxy-8-chlorocaffeine.

3. A new composition of matter consisting of the nitrite ester of $7^1$-hydroxy-8-chlorocaffeine.

4. A process for manufacturing the esters of $7^1$-hydroxy-8-chlorocaffeine with a nitrogen oxy-acid, which process comprises the step of causing the silver salt of the nitrogen oxy-acid to react with 7:8-dichlorocaffeine.

5. A process for manufacturing the nitrate ester of $7^1$-hydroxy-8-chlorocaffeine, which process comprises the step of causing silver nitrate to react upon 7:8-dichlorocaffeine.

6. A process for manufacturing the nitrite ester of $7^1$-hydroxy-8-chlorocaffeine, which process consists of causing silver nitrite to react with 7:8-dichlorocaffeine.

JOHN H. SPEER.